United States Patent
Barnbrook et al.

[15] 3,672,019
[45] June 27, 1972

[54] METHOD OF ADJUSTING ROLLING BEARINGS

[72] Inventors: Thomas George Barnbrook; Frederick James Wren, both of Northampton, England

[73] Assignee: The Timken Company, Canton, Ohio

[22] Filed: June 22, 1970

[21] Appl. No.: 48,286

[30] Foreign Application Priority Data

June 30, 1969 Great Britain......................33,018/69

[52] U.S. Cl. .........................................................29/148.4 A
[51] Int. Cl..........................................................B23p 11/00
[58] Field of Search.....................29/148.4 A, 148.4, 149.5; 308/236, 207

[56] References Cited

UNITED STATES PATENTS 2,101,130  12/1937  Christman.........................29/148.4 A
3,118,711  1/1964   Bachelet et al. .......................308/236
3,182,379  5/1965   Bachelet et al. ...................29/148.4 A

*Primary Examiner*—Thomas H. Eager
*Attorney*—Gravely, Lieder & Woodruff

[57] ABSTRACT

A bearing capable of carrying thrust loads is adjusted by positioning a spacer washer against one of the bearing races and applying an axial load to that washer. The load is resisted by the bearing and is sufficient in magnitude to deform the washer first elastically and then plastically. The plastic deformation is such that upon removal of the axial load and recovery of the elastic deformation, the spacer will provide the desired end play or preload adjustment for the bearing.

14 Claims, 11 Drawing Figures

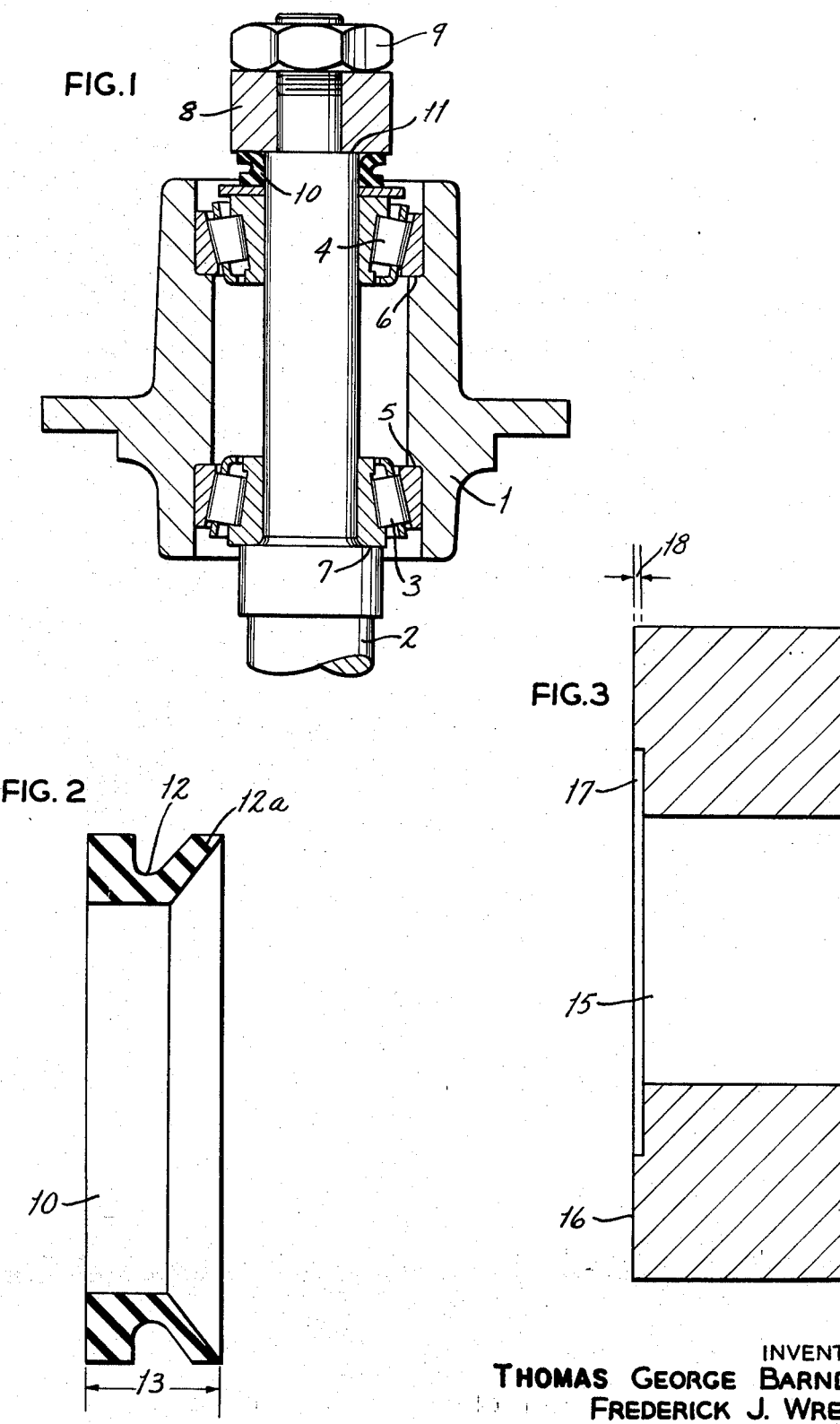

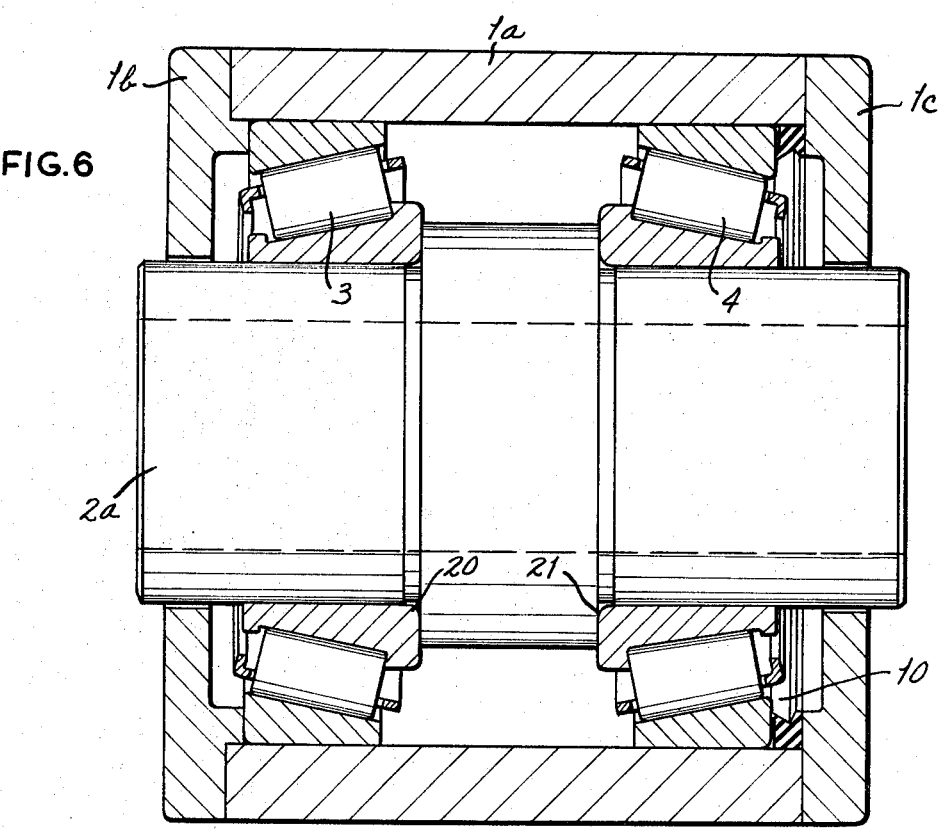
FIG. 6
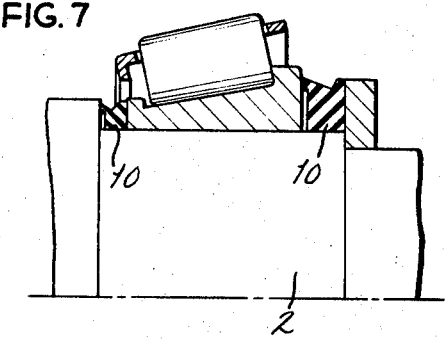
FIG. 7
FIG. 8
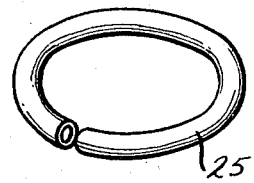
FIG. 9
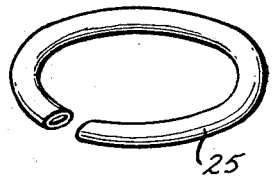
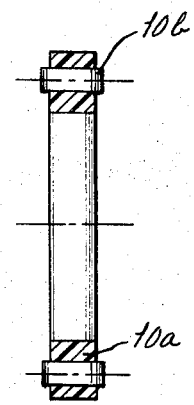
FIG. 10
FIG. 11
STATIC THRUST CAPACITY OF BEARING
LOAD
DEFLECTION

METHOD OF ADJUSTING ROLLING BEARINGS

BACKGROUND OF THE INVENTION

This invention relates to rolling bearings capable of carrying thrust loads and the adjustment of assemblies involving such bearings.

A well known bearing assembly comprises a shaft mounted in a housing by means of tapered roller bearings, a pair of the tapered roller bearings being used to enable the bearing assembly to resist loads on the shaft. The inner races of the bearings are fitted on to the shaft, and the outer races are fitted into the housing. The two tapered roller bearings are commonly arranged in either what is termed the "direct configuration" or the "indirect configuration."

Because of manufacturing tolerances in the production of the shaft, the housing and also, although normally to a lesser extent, the tapered roller bearings themselves, it is necessary to provide a means for taking up any undue amount of end play in the assembly, and also at times to eliminate end play completely and provide preload of the baring assembly. It is thus known to incorporate a solid steel spacer washer between a nut or a cap on the end of the shaft or the housing respectively and the inner race or outer race of the adjacent tapered roller bearing to adjust the end play of the shaft in the bearing assembly to a desired value or to establish the desired preload. It is necessary to hold a stock of spacer washers of different axial thicknesses and/or to provide means for grinding a spacer washer to a desired axial thickness, because the amount of actual end play to be taken up varies between bearing assemblies, due to variations in the actual dimensions of its component parts within the allowed manufacturing tolerances.

SUMMARY OF THE INVENTION

The present invention provides a spacer washer which is adapted to deform first elastically and then plastically upon the application of an axial load thereto and then to recover the elastic deformation when the load is removed.

The invention further proposes a method of adjusting a bearing assembly for end play or preload, the bearing assembly including a shaft, a housing and one or more rolling bearings mounting the shaft for relative rotation with the housing, and a collapsible spacer washer which has been deformed in situ., in the plastic range to the extent necessary to provide a desired adjustment of the assembly for end play or preload.

It is possible by making use of the collapsible spacer and methods of adjustment as proposed by this invention to rationalize the holding of stocks of spacer washers because only a single thickness of spacer washer need be held for each size bearing, and to achieve a more rapid, simplified and more exact adjustment of end play and/or preload in a bearing assembly.

The invention also affords significant advantages in the setting up of bearing assemblies, these advantages being especially marked when a bearing assembly has to be taken down and rebuilt by a service engineer in the field. A service engineer provided with the requisite deforming tool and a spare spacer washer can adjust rebuilt bearing assemblies in the field as easily as he can in a fully equipped workshop.

DESCRIPTION OF THE DRAWINGS

The invention will be further described with reference to the accompanying generally schematic drawings, wherein:

FIG. 1 is an axial sectional view of a bearing assembly embodying the teachings of this invention:

FIG. 2 is a diametrical sectional view of a collapsible spacer washer according to this invention;

FIG. 3 is a diametrical sectional view of a deforming tool;

FIG. 6 is an axial sectional view of another bearing assembly incorporating a collapsible spacer washer according to the invention;

FIG. 7 is a fragmentary view illustrating another utilization of a collapsible spacer washer, according to the invention in a bearing assembly;

FIGS. 8 and 9 are perspective views of another form of collapsible spacer washer according to the invention in the uncollapsed and collapsed condition respectively;

FIG. 10 is a diametrical sectional view of a further form of collapsible spacer washer according to the invention, and FIG. 11 is an exemplary load/deflection curve for a collapsible spacer washer according to this invention.

DETAILED DESCRIPTION

Figure 4:
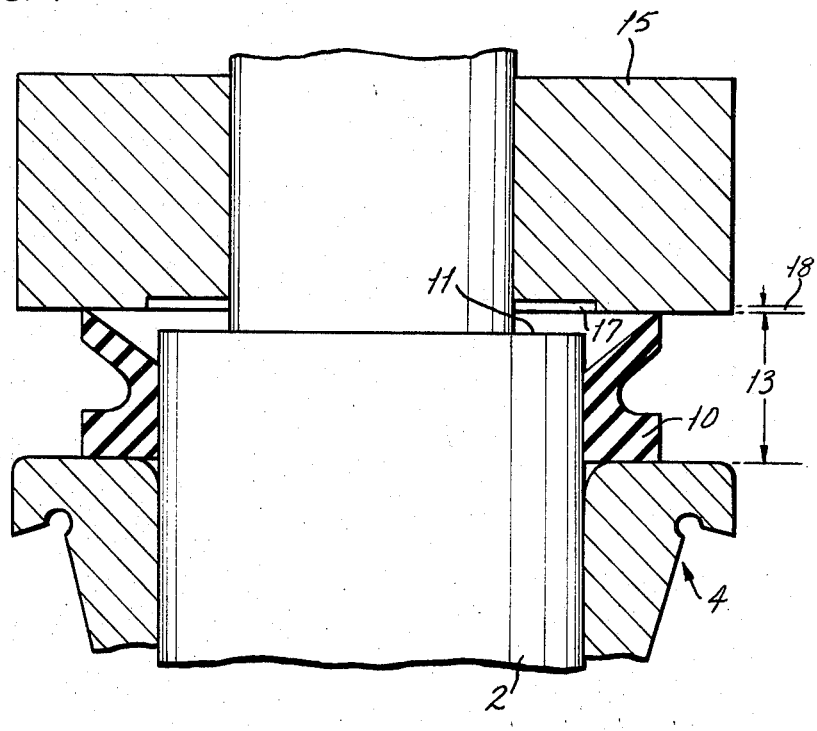
FIGS. 4 and 5 illustrate sequential steps in the method of adjusting a bearing assembly.

FIG. 1 shows an adjusted bearing assembly consisting of a housing 1 and a rotatable shaft 2. The shaft 2 is rotatably mounted in the housing 1 by means of tapered roller bearings 3 and 4 mounted in the "indirect configuration." The outer races of the two bearings 3 and 4 are seated respectively against shoulders 5 and 6 in the housing 1, and the inner races of each bearing are fitted on to the shaft 2. The inner race of bearing 3 is seated against a shoulder 7 on the shaft 2. A collapsible spacer washer 10 is placed between the inner race of bearing 4 with a plain washer interposed between the spacer washer 10 and the back face of the inner race and a flat faced sleeve 8 which is tightened against a shoulder 11 on the shaft by means of a nut 9 threaded on to the end of the shaft. The axial thickness of the spacer washer 10 determines the adjustment of the bearing assembly as to the amount of end play permitted or as to preload.

The collapsible spacer washer itself is shown in FIG. 2. The spacer washer 10 consists of an aluminum alloy ring which is formed with a radiused circumferential groove 12 as shown in FIG. 2 or can be a plain V-groove as shown in other figures, and has a flared flange 12a defined in part by one side of the groove. The shape of the washer with groove 12 is shown merely as an example, and other shapes are possible. The axial thickness 13 of the spacer washer 10 is such that the spacer washer is capable of plastic deformation when placed in an assembly in which the accumulated tolerances and desired adjustment are at the extreme limits. The shape and configuration of the spacer washer 10 and the material of which it is composed are such that when the washer is subjected to an axial load of sufficient degree it will deform first elastically and then plastically to take a permanent set, and then will recover the elastic deformation when the load is removed. With a spacer washer 10 shaped as shown in FIG. 2, the permanent deformation (axial collapse) of the washer will be partly through compression and partly through bending of the flange although bending will be the major factor.

The method of adjusting the bearing assembly will now be described with reference to FIGS. 3, 4 and 5. The housing 1, shaft 2 and tapered roller bearings 3 and 4 are assembled generally as shown in FIG. 1. The collapsible spacer washer 10 is then fitted over the shaft 2 as shown in FIG. 4 to rest on the inner race of the bearing 4 (if an intermediate plain washer is used as shown in FIG. 1, this intermediate washer is positioned before the spacer washer 10 is fitted over the shaft). A deforming tool, shown in FIG. 3, is then put on to the shaft. The deforming tool 15 consists of a ring, preferably of steel, which has a flat face 16 extending normal to the axis of the ring. A recess 17 is formed in this face 16. The depth 18 of the recess 17 is equal to the elastic recovery of the spacer washer 10 plus any required end play in the bearing assembly. If preload is required in the adjusted assembly bearing, then the depth of the recess 18 is equal to the elastic recovery of the spacer washer 10 less the preload required.

Figure 5:
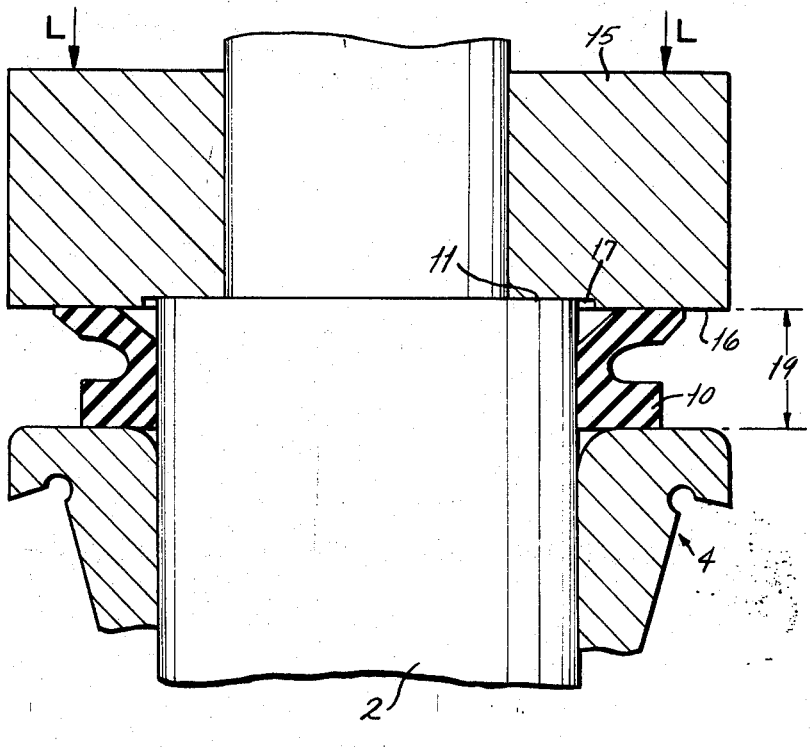

An axial deforming load L is applied through the deforming tool 15 to the spacer washer 10, as seen in FIG. 5. This load may be applied by threading the nut 9 (FIG. 1) on to the end of the shaft, or by means of a press tool. The load L is resisted at the bearing 4. More particularly the axial load L is opposed by an equal and opposite reaction force which is transmitted from the shaft 2 through the rolling elements of the bearing 3 to the housing 1 and thence through the rolling elements and inner race of the bearing 4 to the spacer washer 10. Application of the deforming load is continued until the bottom of the recess 17 contacts the shoulder 11 of the shaft. The spacer washer 10 collapses axially under the application of the load. The load must be great enough to cause the spacer 10 to deform in its plastic range. It is preferred to rotate the bearings whilst the load is applied to ensure the rollers are seated.

The load compresses the spacer 10 elastically and then plastically. When the load and the ring 15 are removed, the axial thickness of the spacer 10 will increase from the thickness 19 shown in FIG. 5 by the amount of the elastic recovery. The deforming ring 15 is then replaced by the washer 8 and the nut 9 tightened in the usual manner until the washer 8 presses against the shoulder 11 on the shaft. The bearing assembly will now have the desired adjustment.

If an axial load is now applied to the spacer 10 it will deflect more than a solid spacer and it is expected therefore that bearing assemblies can be adjusted by this method to a much closer degree of engagement. It is possible in many cases to build preload into an assembly when previously end play was necessary.

The inner race of the bearing 4 must be at least a sliding fit on the shaft to prevent errors occuring in the adjustment and hence the inner race may be termed an initially shiftable race.

FIG. 6 shows an example of a bearing assembly wherein the tapered roller bearings 3 and 4 are arranged in the "direct configuration" and rotatably journal a shaft 2a in a housing 1a. The inner races of the bearings 3 and 4 are located against shoulders 20 and 21 on the shaft, and the outer race of the bearing 3 is located against a shoulder formed on an end cap 1b of the housing. Adjustment of the bearing assembly is provided by a collapsible spacer washer 10 which in this embodiment is fitted between the outer race of the bearing 4 and an end cap 1c of the housing. The same principles of adjustment apply, and in this case the outer race of the bearing 4 must be at least a sliding fit in the housing 1a so as to be shiftable relative thereto.

FIG. 7 shows the mounting of an inner race of a tapered roller bearing between two spacer washers 10 which provide a means of nipping the inner race axially to deter it from rotating about its seating on the shaft 2 as the shaft rotates.

The spacer washer may be made from metals such as aluminum, aluminum alloy, age hardening aluminum alloy steel or copper.

One example of material which has been found satisfactory for the spacer washer 10 is aluminum alloy BS 1476 HE 19 WP.

FIG. 8 shows another form of collapsible spacer washer 25 in the form of a steel tube formed into a torus which may be open or closed. When subjected to compression in a bearing assembly along the axis of the torus, the washer 25 assumes an approximately elliptical shape as shown in FIG. 9.

A further form of deformable spacer washer is shown in FIG. 10. The washer in FIG. 10 consists of a plastics ring 10a having metal pins 10b set into it axially round the circumference. The diameter, material, and number of the pins 10b is related to the load which the spacer has to carry in the bearing assembly. The pins may be made of any of the materials described above with reference to the washers of FIGS. 2 and 8. In this form of washer, axial collapse of the washer occurs by compression of the pins 10b which deform elastically and then plastically upon the application of an axial deforming load. The plastics ring 10a is provided solely as a means to hold the pins 10b.

A preferred load/deflection curve for collapsible spacer washers is shown in FIG. 11. It will be noted that the elastic limit of the material composing the spacer washer is lower than the static thrust capacity of the tapered roller bearings 3 and 4 (or of the weaker of the two bearings if they are dissimilar). Preferably the maximum load which is applied to the spacer 10 in order to cause it to collapse axially and take a permanent set should not be greater than 75 percent of the static thrust capacity so as to avoid bearing damage. When the spacer washer is deforming in the plastic range, the curve should be as near horizontal as possible. The nearer it is to this, the more accurate the final adjustment of the bearing assembly. The load can be relieved at any point along the plastic range and the amount of elastic recovery should be substantially the same from all points.

Although the invention has been described with reference to tapered roller bearings it is to be understood that it is also applicable to other types of rolling bearings which are capable of carrying thrust loads.

What is claimed is:

1. A method of adjusting a bearing assembly for end play or preload, the bearing assembly including a shaft, a housing, and at least one bearing mounted between the shaft and housing to permit relative rotation between the two, the bearing having a plurality of rolling elements and being capable of carrying radial and thrust loads, said method comprising: positioning a spacer washer in the assembly, applying an axially directed load to the washer sufficient to deform the washer elastically and then plastically; and resisting the axial load by a reaction force transmitted through the rolling elements of the bearing, the plastic deformation being such that upon recovery of the spacer of its elastic deformation after removal of the load the resulting thickness of the spacer will provide the correct bearing adjustment.

2. The method according to claim 1 wherein the spacer washer is plastically deformed by compressing it between the bearing and a tool which is advanced towards the bearing until it engages a limiting surface on the bearing assembly.

3. The method according to claim 1 wherein the spacer washer is plastically deformed by compressing it between the bearing and a tool which is advanced toward the bearing; and wherein the method further comprises installing an abutment-forming element in the bearing assembly after the tool is removed so that the spacer washer is captured between the bearing and the abutment-forming element and when so captured provides the correct adjustment for the bearing.

4. A method of adjusting a bearing assembly which includes an outer member such as a housing, an inner member such as a shaft positioned in the outer member, and at least one bearing mounted between the members to permit relative rotation between the two, the bearing being capable of accommodating a thrust load in the direction of the axis of rotation for the bearing and having one race seated on one of the members, another race which is mounted on the other member and prior to adjustment is shiftable relative to the seated race and said other member so that the adjustment of the bearing is dependent on the position of the shiftable race, and rolling elements interposed between and engaged with the two races, said method comprising: positioning a spacer washer in the bearing assembly such that it is backed by the shiftable race of the bearing, compressing the spacer washer between the shiftable race and a tool which is moved axially with respect to said other member, the compressive force being transmitted through the bearing to said one member and being sufficient to deform the washer first elastically and then plastically, and confining the spacer washer in a substantially fixed axial position with respect to said other member after it has been deformed plastically.

5. The process according to claim 4 and further characterized by withdrawing the tool after the washer has been deformed plastically, whereby the washer will recover the elastic deformation, and wherein the resulting axial thickness of the washer will provide the bearing with the proper adjustment after the washer is axially confined relative to said other member.

6. The process according to claim 5 wherein the spacer washer is axially positioned relative to said other member by installing an abutment forming element in a fixed axial position on said other member, the deformed washer being captured between the shiftable bearing race and the abutment forming element.

7. The process according to claim 6 wherein the tool is advanced axially with respect to said other member until it engages a limiting surface on said other member, whereby the plastic deformation terminates upon the engagement of the tool and the limiting surface; and wherein the abutment forming element is axially positioned with respect to said other member by the limiting surface.

8. A method of adjusting a bearing assembly which includes an outer member such as a housing, an inner member such as a shaft positioned in the outer member, and at least one bearing mounted between the members to permit relative rotation between the two, the bearing being capable of carrying axial and radial loading and having a plurality of rolling elements positioned around the axis thereof, said method comprising: positioning a deformable spacer in the bearing assembly along one of the members; applying an axial deforming force to the spacer; resisting the deforming force by a reaction force transmitted from the other member to said one member through the rolling elements of the bearing; the deforming force being of sufficient magnitude to elastically and then plastically deform the spacer; and positioning an abutment on said one member after the spacer has been plastically deformed to maintain the spacer in the proper position in the bearing assembly; the plastic deformation of the spacer being such that upon recovery of the elastic deformation after relief of the axial deforming force the resulting thickness of the spacer will provide correct bearing adjustment.

9. A method according to claim 8 wherein the bearing in addition to the rolling elements includes a race engaged with the rolling elements and fitted to said one member along which the spacer is disposed such that prior to the application of the deforming force the race is shiftable in the axial direction relative to that one member, whereby the adjustment of the bearing is dependent on the position of the race; and wherein the spacer is positioned between the shiftable race and the abutment.

10. A method according to claim 9 wherein the deforming force is applied by advancing a deforming tool relative to said one member along which the shiftable race is disposed, and terminating the movement of the tool at a predetermined position along said one member.

11. A method according to claim 10 wherein the deforming tool is advanced to and the abutment is positioned by a single limiting surface on said one member along which the shiftable race is positioned.

12. A method according to claim 8 wherein the deforming force is less than the static thrust capacity of the bearing.

13. A method according to claim 12 wherein the spacer plastically deforms under a substantially constant deforming force, whereby the elastic recovery of the spacer will be substantially the same upon relief of the deforming force irrespective of the amount of plastic deformation.

14. A method of adjusting a bearing assembly which includes an outer member such as a housing, an inner member such as a shaft positioned in the outer member, and a pair of axially spaced bearings mounted between the members to permit one member to rotate relative to the other member, each bearing including a plurality of rolling elements encircling the inner member, one of the bearings being mounted to carry thrust loading in one axial direction and the other bearing being mounted to carry thrust loading in the other axial direction, at least one of the bearings having a race which is positioned on one of the members and is initially shiftable axially along that member so that the adjustment of the bearing assembly is dependent on the axial position of the shiftable race with respect to the member along which it is disposed; said method comprising: positioning a deformable spacer in the bearing assembly on the member along which the shiftable race is disposed; applying an axial deforming force to the spacer; resisting the deforming force by a reaction force transmitted from the member along which the shiftable race is disposed to the other member through rolling elements of one of the bearings and thence through the rolling elements of the other bearing to the spacer, the deforming force being of sufficient magnitude to elastically and then plastically deform the spacer; and positioning an abutment in a fixed axial position on the member on which the shiftable race is disposed so that the spacer is captured in the bearing assembly; the plastic deformation of the spacer being such that upon recovery of the elastic deformation after relief of the axial deforming force, the resulting thickness of the spacer will provide the correct bearing adjustment.

* * * * *